United States Patent
Majee et al.

(10) Patent No.: US 7,672,223 B2
(45) Date of Patent: Mar. 2, 2010

(54) METHOD AND APPARATUS FOR REPLICATING A TRANSPORT LAYER PROTOCOL STREAM

(75) Inventors: Sumandra Majee, San Jose, CA (US); Anurag Kahol, Fremont, CA (US); Alexander Waterman, Los Gatos, CA (US); Anh Nguyen, Cupertino, CA (US); Patrick Tate, Atlanta, GA (US); Martin Grimm, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 1171 days.

(21) Appl. No.: 11/074,445

(22) Filed: Mar. 7, 2005

(65) Prior Publication Data
US 2006/0198296 A1 Sep. 7, 2006

(51) Int. Cl.
*G01R 31/08* (2006.01)
(52) U.S. Cl. ........................................ 370/216; 370/401
(58) Field of Classification Search ........................ None
See application file for complete search history.

(56) References Cited

U.S. PATENT DOCUMENTS

| | | | |
|---|---|---|---|
| 5,513,314 A | | 4/1996 | Kandasamy et al. |
| 6,178,450 B1 * | | 1/2001 | Ogishi et al. ................. 709/224 |
| 6,208,616 B1 * | | 3/2001 | Mahalingam et al. ....... 370/216 |
| 6,393,581 B1 * | | 5/2002 | Friedman et al. ............... 714/4 |
| 6,839,344 B1 * | | 1/2005 | Couillaud et al. ........... 370/353 |
| 7,076,555 B1 * | | 7/2006 | Orman et al. ............... 709/227 |
| 7,515,612 B1 * | | 4/2009 | Thompson .................. 370/474 |
| 2002/0129159 A1 * | | 9/2002 | Luby et al. .................. 709/236 |
| 2005/0005188 A1 * | | 1/2005 | Hsu et al. ....................... 714/2 |

OTHER PUBLICATIONS

Zhiyuan Shao Hai Jin Bin Chen Jie Xu Jianhui Yue, HARTs: high availability cluster architecture with redundant TCP stacks, Apr. 9, 2003, IEEE, Conference Proceedings of the 2003 IEEE International Performance, Computing, and Communications Conference, 2003, pp. 255-262.*
Bartlett, Joel F. et al, "A NonStop Kernel," Tandem Computers Technical Report 81.4, Jun. 1981, PN87603, 18 pages.
Sitaker, Kragen et al., "Beowulf mailing list FAQ, version 2," May 13, 1999, located on the internet at <http://www.canonical.org/~kragen/beowulf-faq.txt>, retrieved on Oct. 7, 2004, 7 pages.

* cited by examiner

*Primary Examiner*—Jayanti K Patel
*Assistant Examiner*—Hooman Houshmand
(74) *Attorney, Agent, or Firm*—Hickman Palermo Truong & Becker LLP (57) ABSTRACT

Network connection switchover is accomplished through a method comprising receiving information defining a first connection between a first network device and a computer; establishing a replication channel between the first network device and a backup device; storing backup control information at the backup device; communicating a message flow between the first network device and the computer on the first transport connection; in response to unavailability of the first network device, communicating messages on the replication channel that cause (a) establishing a second connection between the backup device and the computer; (b) continuing communication of the message flow between the backup device and the computer based on the backup control information. TCP connections, for example, can be switched from an active device to a backup device without reset or re-transmission.

15 Claims, 7 Drawing Sheets

METHOD AND APPARATUS FOR REPLICATING A TRANSPORT LAYER PROTOCOL STREAM

FIELD OF THE INVENTION

The present invention generally relates to network management. The invention relates more specifically to methods and systems providing fault-tolerant processing of transport layer protocol connections in networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Modern computer networks based on routers, switches and other infrastructure elements generally are reliable and can offer clients robust service. Consequently, end users have become less tolerant of failure and delay in network communication. Further, entities that make or lose money based upon the reliability of network equipment, such as those in the field of online commerce, are especially intolerant of network problems. Nevertheless, client devices are most adversely affected when a critical service goes down. Therefore, customers and network gear vendors are seeking ways to provide equipment that has greater fault tolerance.

Many services are provided in networks that use transport layer protocols, such as Transmission Control Protocol (TCP), for communications between clients, infrastructure elements such as routers, switches, and proxy devices, and servers. If TCP connections can be made more reliable, then services carried on the TCP connections will be inherently more resilient to failures. However, a significant challenge in providing fault-tolerant TCP service is to provide a way that a fully terminated TCP stream can migrate from one end node to another end node.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for replicating a network connection, such as a transport layer protocol stream over TCP, are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Details of an Embodiment of Replicating a TCP Stream
   3.1 Initial Connection Setup
   3.2 Data Transfer Phase
   3.3 Connection Termination
   3.4 Connection Switchover
4.0 Implementation Mechanisms-Hardware Overview
5.0 Extensions and Alternatives

1.0 General Overview

The needs identified in the foregoing Background, and other needs and objects that will become apparent for the following description, are achieved in the present invention, which comprises, in one aspect, a method comprising receiving information defining a first connection between a first network device and a computer; establishing a replication channel between the first network device and a backup device; storing backup control information at the backup device; communicating a message flow between the first network device and the computer on the first transport connection; in response to unavailability of the first network device, communicating messages on the replication channel that cause (a) establishing a second connection between the backup device and the computer; (b) continuing communication of the message flow between the backup device and the computer based on the backup control information. TCP connections, for example, can be switched from an active device to a backup device without reset or re-transmission.

According to one feature, the unavailability is determined by communicating messages on the replication channel. In another feature, the first connection, second connection, and replication channel are TCP connections. In yet another feature, the first network device sends an initial sequence number and window size value for the first connection to the backup device while the first network device is performing a TCP handshake with the computer. In still another feature, the first network device forwards, to the backup device and using the replication channel, fake TCP segments corresponding to TCP segments received from the computer on the first TCP connection.

According to another feature, the first network device acknowledges receipt of the TCP segments only after receiving acknowledgment of the fake TCP segments from the backup device. In another feature, the first network device tracks acknowledgment messages sent by the backup device on the replication channel, and wherein the first network device determines that the backup device or the replication channel is unavailable when the backup device fails to send expected acknowledgment messages on the replication channel.

In certain embodiments, the first network device instructs the backup device to remove the backup control information in response to closing the first TCP connection. In another embodiment, the first network device receives a FIN TCP segment from the computer, sends a replicated FIN segment to the backup device, and sends an ACK segment to the computer only after receiving an ACK segment from the backup device corresponding to the replicated FIN segment.

In other aspects, the invention encompasses a computer apparatus and a computer-readable medium configured to carry out the foregoing steps.

2.0 Structural and Functional Overview

According to the present approach, a transport layer protocol connection or stream from a client to a server is replicated, so that the stream can be redirected to a different device if required. Redirection may occur in response to failure of an active device, for load balancing purposes, to accommodate preventive maintenance on an active device, or any other suitable purpose. The approaches described herein can be implemented in the TCP stack, for example, of any computer operating system. Alternatively, the approaches can be implemented in specialized proxy devices that implement their own TCP stacks. For convenience, certain embodiments are described herein with reference to TCP as an implementation protocol. However, the general approaches described herein can be implemented in any connection-oriented telecommunication protocol.

A server can initiate TCP connections to external endpoints, and therefore a server could initiate a new TCP connection in response to determining that a prior connection has failed or that the endpoint is unavailable. Alternatively, with the approaches herein, client-initiated TCP connections can be made fault tolerant.

Figure 1A:
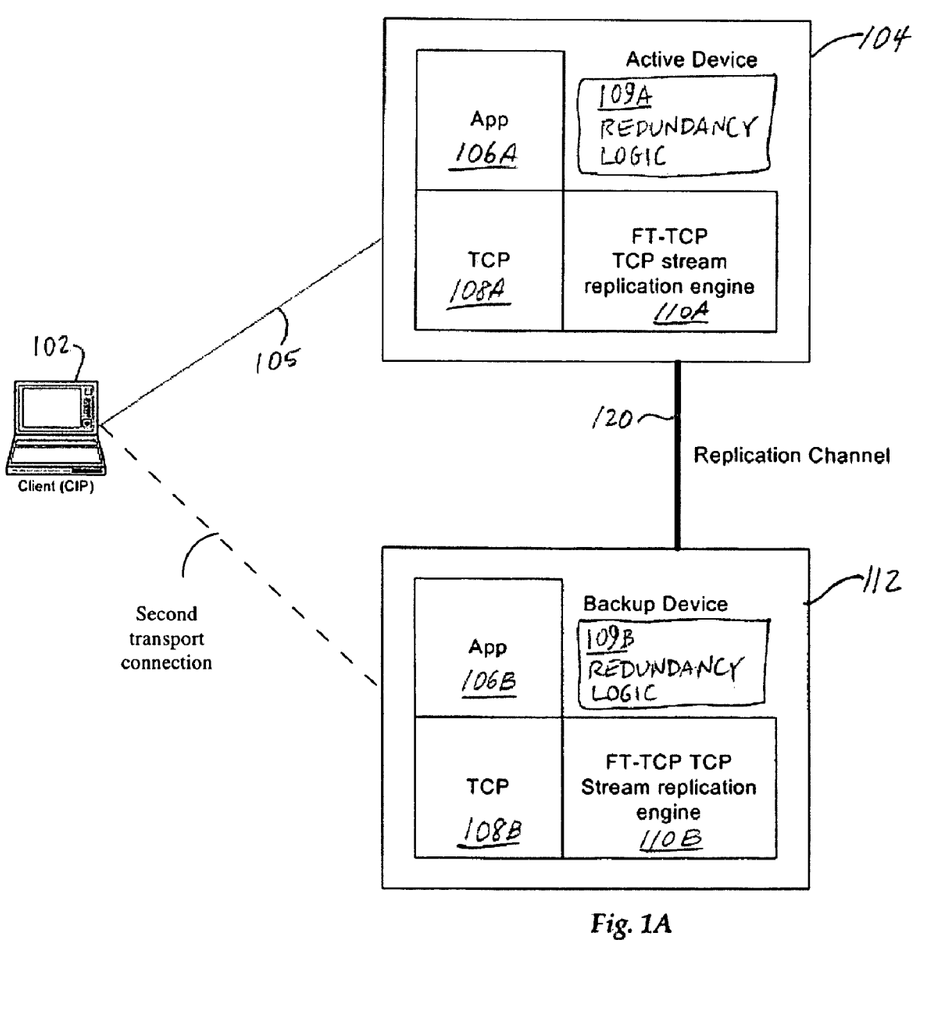
FIG. 1A is a block diagram that illustrates an overview of a network system in which an embodiment can be implemented.
Figure 1B:
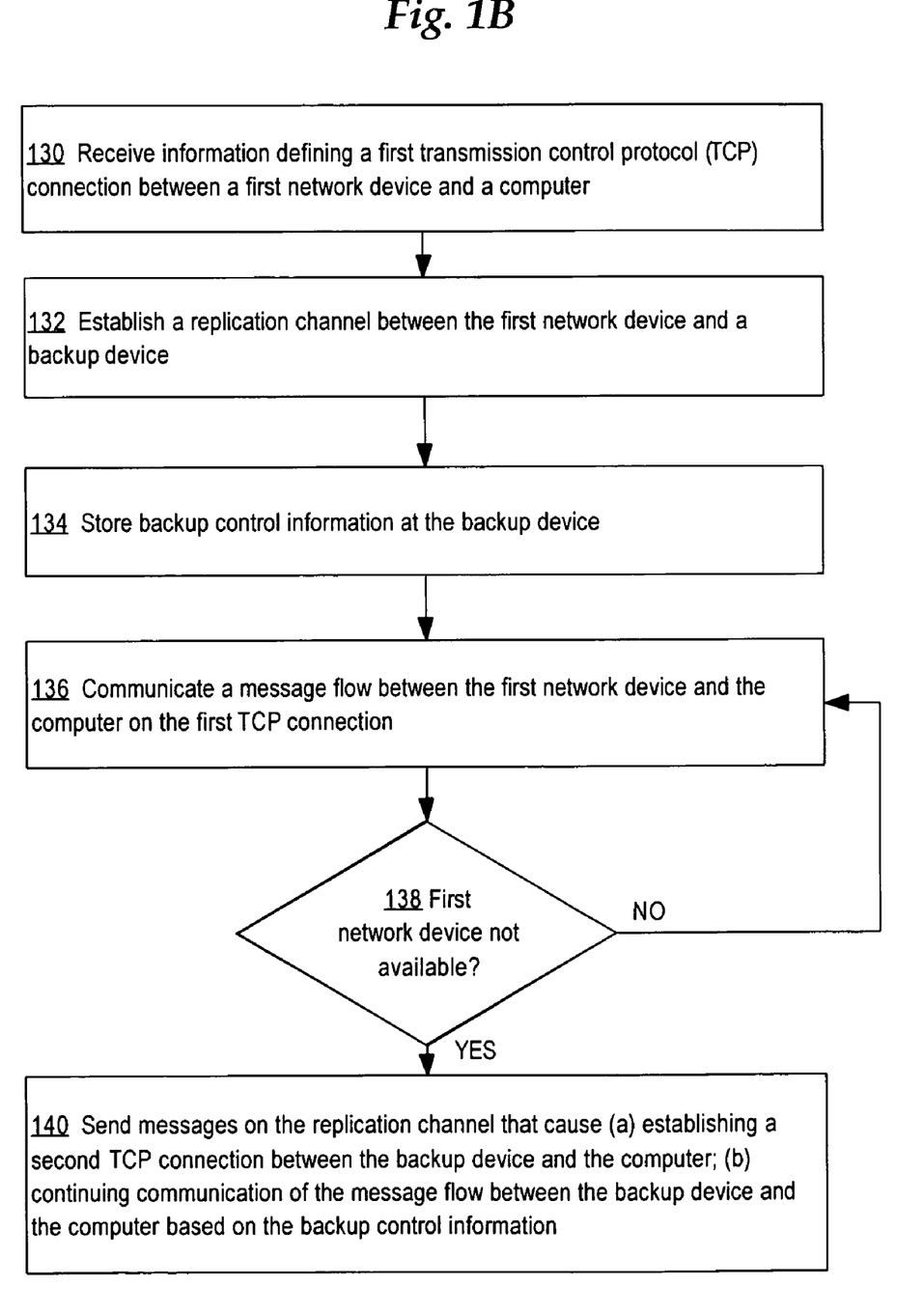
FIG. 1B is a flow diagram that illustrates a high level overview of one embodiment of a method for replicating a transport layer protocol stream.

FIG. 1A is a block diagram that illustrates an overview of a network system in which an embodiment can be implemented. FIG. 1B is a flow diagram that illustrates a high level overview of one embodiment of a method for replicating a transport layer protocol stream. Referring first to FIG. 1A, a client 102 is communicatively coupled through a link 105 to an active device 104 that hosts an application 106A, a TCP process 108A, and a stream replication engine 110A. A replication channel 120 communicatively couples active device 104 to a backup device 112, which hosts corresponding instances of an application 106B, a TCP process 108B, and a stream replication engine 110B.

Client 102 may be any computing device that performs data processing functions that are useful to any kind of end user, and may be implemented in various embodiments as a personal computer, workstation, or other end station, or as a network infrastructure element. Active device 104 and backup device 112 may comprise servers, routers, switches, or any other nodes that provide any form of service over link 105 to client 102. For example, active device 104 and backup device 112 can comprise SSL proxy devices, server load-balancing devices or proxies, BGP-enabled routers, etc. In the embodiment of FIG. 1A, applications 106A, 106B may be any computer program, process, or other software element that runs on top of TCP processes 108A, 108B, respectively. For example, applications 106A, 106B may implement Secure Sockets Layer (SSL) or TLS, BGP, other routing protocols, or other services.

Link 105 is any form of telecommunication link through which client 102 and active device 104 can communicate information. Typically, link 105 provides at least transport-layer connectivity, and in one specific embodiment, the link is a TCP link.

Replication engines 110A, 110B comprise any computer program, process, or other software element that implement the functions described further herein. Replication channel 120 is any telecommunication link between active device 104, 112 that can communicate replication messages as described herein. In one embodiment, replication channel 120 is a TCP link and the replication messages are TCP segments.

Active device 104 hosts redundancy logic 109A and backup device 112 hosts a corresponding instance of redundancy logic 109B. Redundancy logic 109A is responsible to detect a failure or unavailability condition at the active device 104 or replication channel 120, transfer data link layer and network layer information such as IP addresses, MAC addresses or IP-MAC bindings to reference the backup device, and trigger the replication engine 110A to perform switchover of the connection to client 102. Redundancy logic 109B performs the same function when the backup device 112 becomes active. In one embodiment, redundancy logic 109A, 109B are implemented using the redundancy protocols HSRP, VRRP (as defined in IETF RFC 2338, 3768), etc. A complete description of such redundancy protocols is outside the scope of this disclosure, which assumes the availability of some form of detection and trigger mechanism for failure or unavailability of the active device 104 or replication channel 120.

For purposes of illustrating a clear example, FIG. 1A shows one client 102, active device 104 and backup device 106. However, an actual embodiment may include any number of clients and supporting network nodes.

A network system arranged as in FIG. 1A may support the following principle of operation. One active device terminates a TCP connection with a client, and another backup device stores information for a replicated TCP stream. When the active device, fails the backup device assumes the processing role of the active device, and switches TCP connection to itself. For purposes of the following description, a fully terminated TCP connection can be visualized as one inbound flow, comprising data originating from the client, and one outbound flow comprising data originating from the server. The end goal of an embodiment is to create a backup TCP connection block on the backup device, such that upon failover the connection is not terminated, and the data transfer over a connection occurs with little or no interruption.

Referring now to FIG. 1B, a method for replicating a transport layer protocol stream begins at step 130 in which information defining a first TCP connection between a first network device and a computer is received. For example, in the context of FIG. 1A, active device 104 corresponds to the first network device, client 102 corresponds to the computer, and in step 130 replication engine 10A learns that a TCP connection has been established between client 102 and TCP process 108A.

In step 132, a replication channel is established between the first network device and a backup device. For example, replication channel 120 is established between active device 104 and backup device 106. In step 134, backup control information is stored at the backup device. In one embodiment, step 134 involves storing the TCP initial sequence number and acknowledgement number for the first TCP connection in a backup transmission control block (TCB) at the backup device. This positions the backup device 106 to take over from the active device with complete knowledge of the state of the first TCP connection at the time of switchover or failure.

In step 136, a message flow is communicated between the first network device and the computer on the first TCP connection. For example, the first TCP connection reaches an ESTABLISHED state and TCP segments then flow between the first network device and the computer.

In step 138, a test is performed to determine whether the first device is unavailable. Specific mechanisms for determining unavailability are described further below. If the first device is unavailable, as indicated by a negative result at test 138, then control flows to step 136 and communication continues. If the first device is unavailable, then at step 140, messages are sent on the replication channel that cause the backup device and the computer to establish a second TCP connection. Further messages on the replication channel cause the message flow of the first TCP connection to continue between the backup device and the computer based on the backup control information. Thus, using the backup TCB, the backup device can transparently take over for the failed device without dropping any TCP segments or forcing re-transmission of segments.

In operation in the context of FIG. 1A, generally, client 102 is TCP connected through link 105 to the active device 104 and application 106A, which may be a proxy server, for example. The active device 104 then uses the replication link 120 to replicate the TCP stream flowing through link 105 to the backup device 112. The backup device 112 stores backup control information for use in the event of switchover. For example, backup device 112 creates a backup TCB, and stores information about the stream on link 105 in the TCB. The application 106B on the backup device 112 communicates with the backup TCB. The backup TCB does not communicate with the client 102 until the backup device 112 becomes active and the stream is switched to the backup device. Replication messages are sent on a different TCP channel than the stream, over the replication link 120.

3.0 Details of an Embodiment of Replicating a TCP Stream 3.1 Initial Connection Setup In one embodiment, replicating a TCP stream includes an initial connection setup step. In this step, a client initiates a connection to an active device. At the end of the initial connection setup step, the backup device has stored replicated TCP flow information in a TCP control block for the connection.

Figure 2:
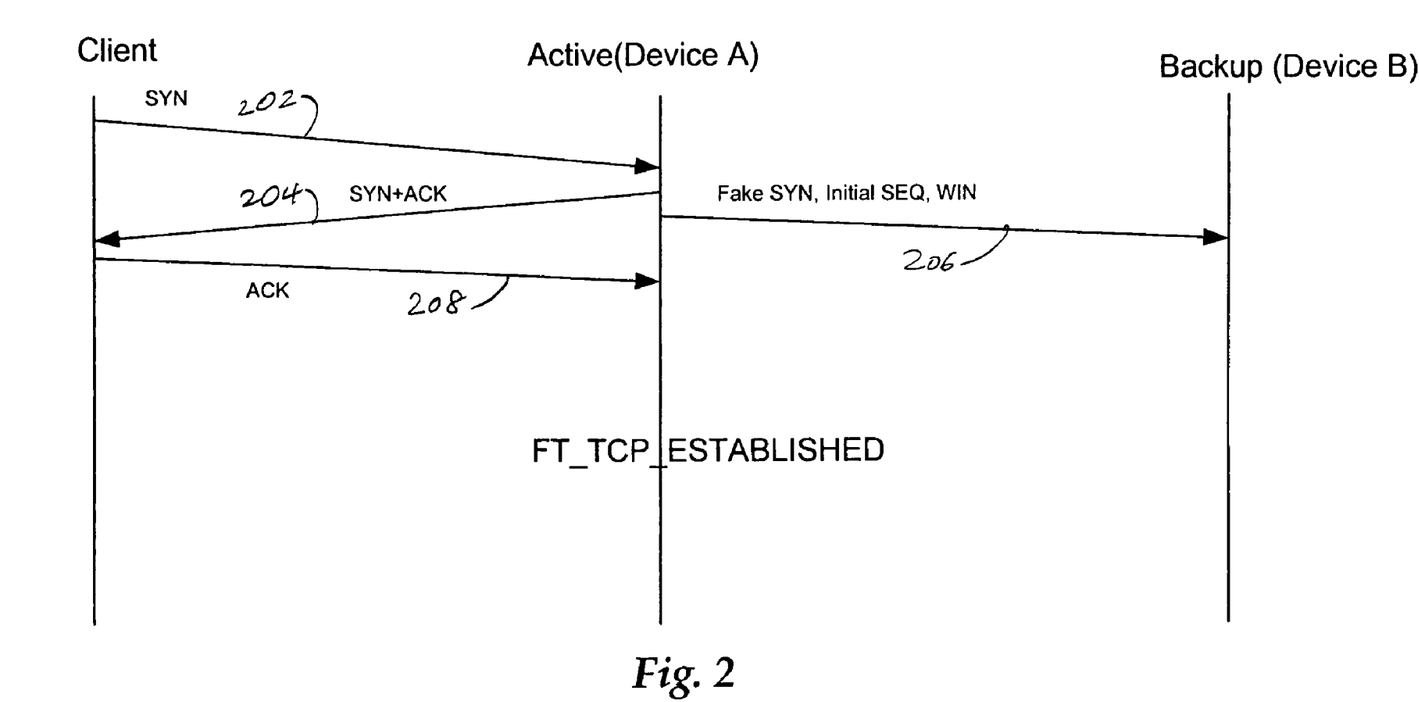
FIG. 2 is a ladder message diagram showing a process of reaching an ESTABLISHED state in the approach herein.

Referring now to FIG. 2, Client C sends a SYN segment with SEQ=X to the Active device, as indicated by arrow 202. The Active device sends a SYN+ACK segment to the client at arrow 204, and also sends a Fake SYN segment to the Backup device at arrow 206. The Fake SYN segment is termed "fake" because it is formed as a valid SYN TCP segment, but does not actually cause the result of a real SYN segment on the active connection with the client, because it is not sent to the Client. Each fake segment described herein can be sent on replication channel 120 using a dedicated port number value. The Fake SYN segment carries the initial TCP SEQ and ACK number values, as well as the four-tuple of values that identify a flow. Typically the four-tuple comprises client IP address, client port, destination IP address, and destination port values. The SEQ and ACK values enable the Backup device to properly identify segments, without triggering re-synchronization or connection closing, when the Backup assumes control of the connection.

In response to receiving the Fake SYN segment, the Backup device stores backup TCP flow information and TCB values for the connection, including the SEQ and ACK number values.

At arrow 208, the Client sends an ACK segment, thereby completing a three-way handshake with the Active device. The Active device receives the ACK, which completes the establishment of a TCP connection. In one embodiment, the connection is deemed to have entered an FT_TCP_ESTABLISHED state. Until the ESTABLISHED state is reached, the Active device is not allowed to receive traffic from the Client. The Backup device need not acknowledge the fake SYN segment, because it is sent over a TCP channel.

In the established state, the backup device has a replicated TCB and associated flow information, with all information necessary to assume control of the connection later, including the four-tuple of flow identifying values, SEQ number, window size, etc.

3.2 Data Transfer Phase

After initial connection establishment, the client and the active device enter a data transfer phase. In the data transfer phase, all TCP segments from the client for the connection are forwarded to the backup TCB over the replication channel. The forwarded data is termed "fake data." Upon receiving fake data, the backup device responds with an acknowledgment segment to the active device. When the active device sends an ACK to the client, the ACK number is set to the last fake ACK that was received from the backup device. In this way, the active device acknowledges to the client only data that has been successfully forwarded to the backup device. Further, this approach ensures that the active device and backup device are always identically synchronized to the client.

For purposes of the following description, a TCP connection between a client and an active device is considered as two separate flows, in which one flow is inbound from the client to the active device and another flow is outbound from the active device to the client.

Figure 3:
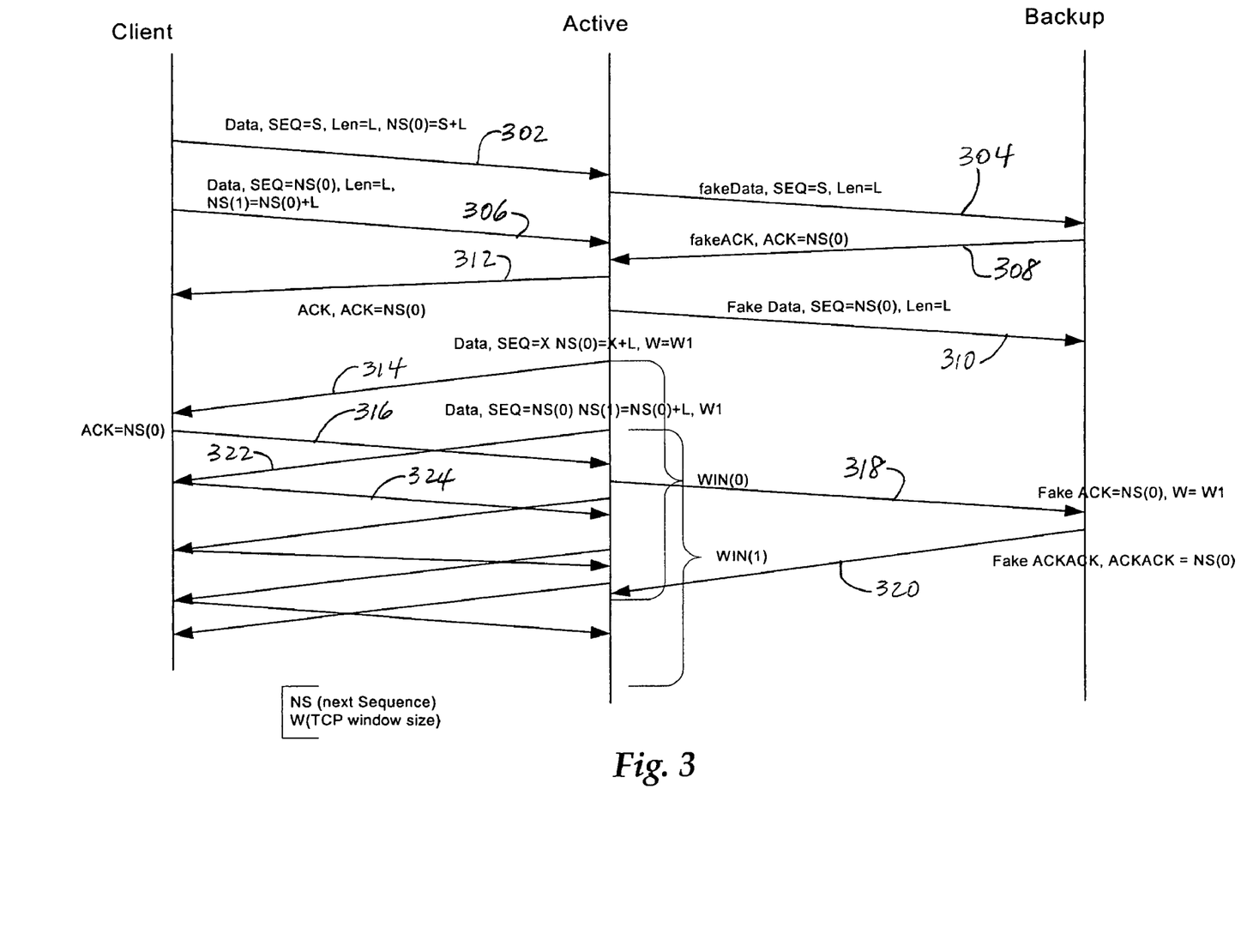
FIG. 3 is a ladder message diagram showing a process of communicating backup stream information.

Inbound flow data transfer is addressed first. Referring now to FIG. 3, assume that the client sends 100 bytes of data with SEQ=100 to the active device; therefore, the client therefore expects to start the next segment with a next SEQ, NS_SEQ=200, as shown by arrow 302. For convenience, FIG. 3 and this description use symbolic notation for TCP segments in which the length of data is denoted L, a sequence number is S, a next sequence number for a first segment is NS(0), a next sequence number for a second segment is NS(1), etc.; actual TCP segments that conform to this approach will use actual values that will vary according to the initial sequence number that is selected, and the particular data that is sent. The active device forwards the data as fake data to the backup device, as shown with arrow 304. The client 102 sends another data segment with SEQ=200, as shown by arrow 306. The active device forwards the data to the backup device at arrow 310.

The backup device receives the first fake data segment and sends a fake ACK segment with ACK=200 to the active device, at arrow 308. Thus, the active device determines that the backup device has not yet received the second data segment. The active device then sends an ACK segment to the client with ACK=200, at arrow 312. The client continues to send data as long as the current window size permits. However, since the ACK segment from the active device always follows the fake ACK segment from the backup device, the client is forced to retransmit any data that the backup may not have received. This approach keeps both the active and backup devices synchronized.

Outbound data transfer is now described. Most protocols are structured in a request-response fashion. For example, in HTTP, a client issues a GET request and a server responds with a response containing an HTML document. The response is termed outbound data in this description. Generally, the backup device receives fake data segments forwarded from the active device. The data segments are passed to an application hosted in the backup device. The application constructs response data as necessary, and passes the response data on for transmission.

Typically the form of a response can be derived completely from the request. In that case, an application on the backup device can read incoming fake data and can generate response packets that are identical to response packets that are generated by the active device; the only difference is that the backup device does not send its response packets to the client. However, in other cases the backup device may need certain state information from the active device to generate a duplicate response. Providing such state information is outside the scope of this disclosure; the approach herein assumes that the backup device has received all information necessary to generate a duplicate response packet. Synchronization of the inbound flow ensures that the backup device receives the same request information as the active device.

Upon connection switchover, the new active device, formerly the backup device, must be able to send data with the correct SEQ number. Therefore, in the approach herein, ACK segments from the client and corresponding to response packets are tracked. Referring again to FIG. 3, assume that both the active device and backup device receive a request REQ1 and the response spans six (6) TCP segments labeled RS0 ... RS5. Also assume that the current window size, denoted W, is 3.

At arrow 314, the active device sends a response to the client. The backup device also generates a response, but the backup response is not sent to the client. The response of arrow 314 carries data of length L, a SEQ value of X, a next sequence value denoted NS(0) equal to X+L, and a window size value denoted as W1.

The active device receives an ACK segment from the client for the last transmitted segment at arrow 316. At arrow 318, the active device generates and sends to the backup device a fake ACK segment carrying a current SEQ value, denoted NS(0) and obtained from the client ACK segment, and carrying the current window value W1.

Upon receiving the fake AC segment, the backup device creates a response. At arrow 320, the backup device generates and sends an ACK segment for the fake ACK segment received on arrow 318. Alternatively, if the replication channel is implemented as a TCP connection, then there is no need for an explicit acknowledgment of the fake ACK segment received from the active device, and arrow 320 can be eliminated. Consistent with the TCP standard, the client also could send a TCP segment that contains data and also has an ACK bit set. In that case, the active device can send the backup device a combined fake segment that contains both data and has the ACK bit set.

As indicated by arrows 322, 324, etc., the foregoing process continues as long as the active device has data to send. The client acknowledges each segment and corresponding fake ACK segments are sent to the backup. The sliding window size is adjusted from WIN(0) to WIN(1) as appropriate. In this manner, the backup device maintains synchronization with the active device and, upon failover, the backup device can immediately initiate sending data without causing the client to close the connection or re-transmit data.

3.3 Connection Termination

Figure 4A:
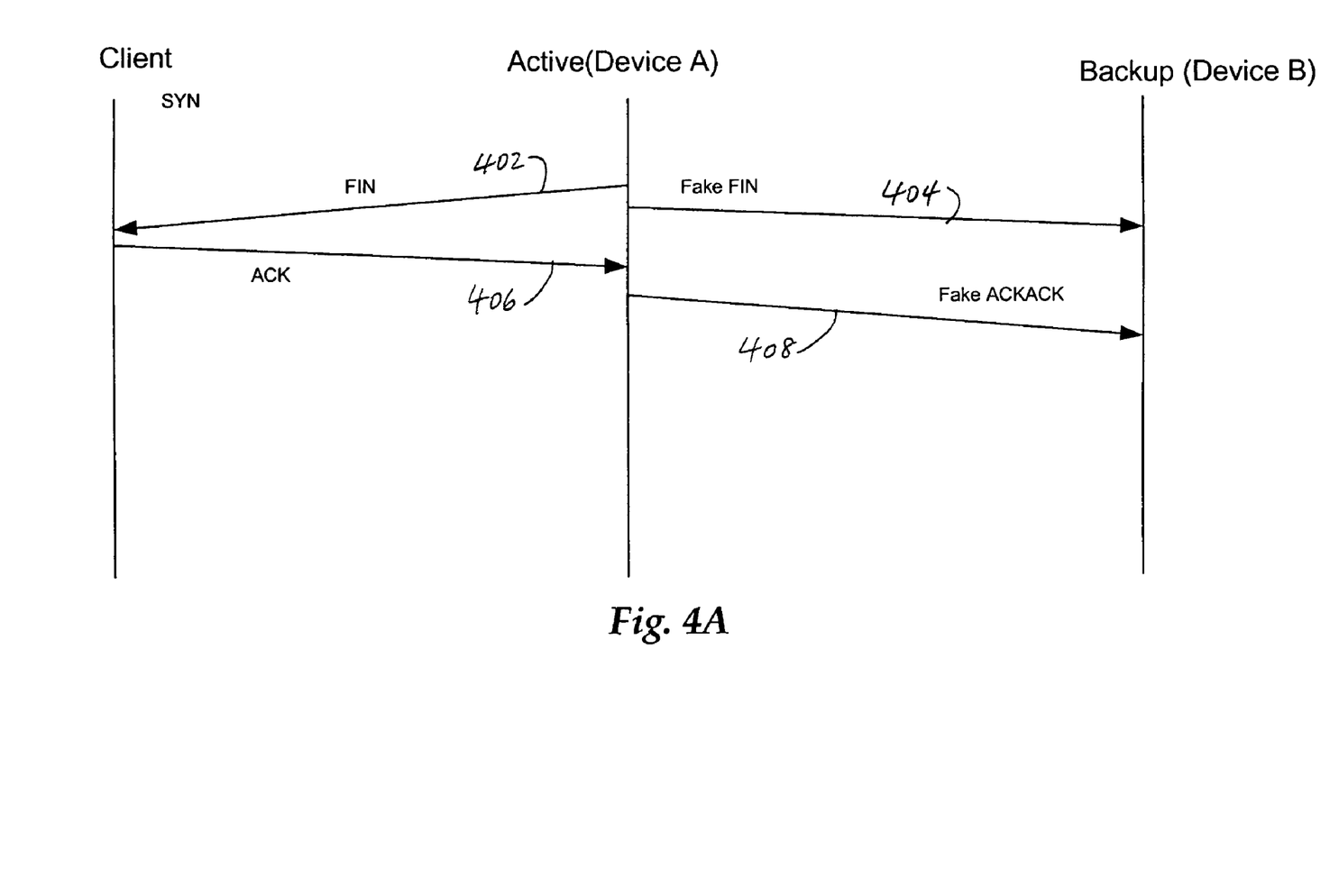
FIG. 4A is a ladder message diagram of a first approach for termination of a stream.
Figure 4B:
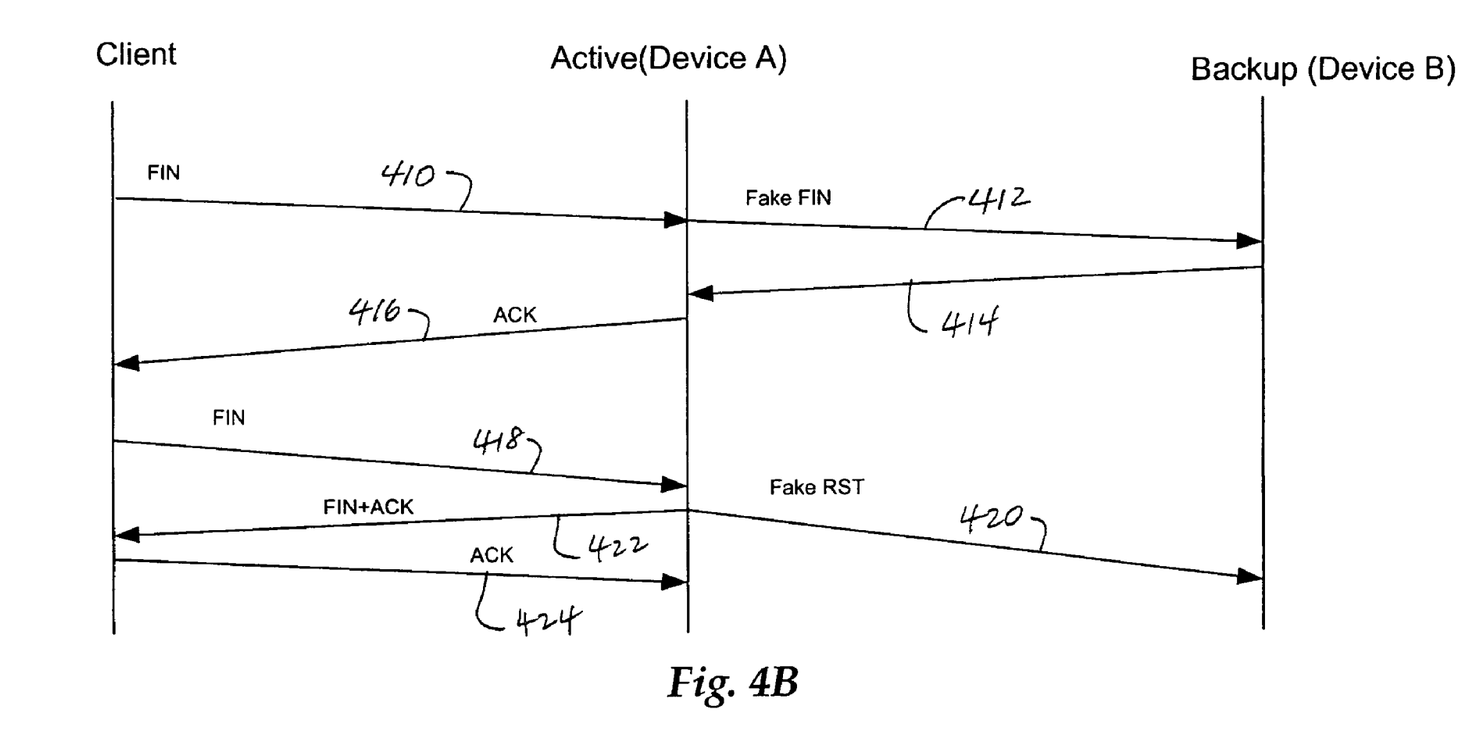
FIG. 4B is a ladder message diagram of a first approach for termination of a stream.

FIG. 4A is a ladder message diagram of a first approach for termination of a stream; FIG. 4B is a ladder message diagram of a first approach for termination of a stream. In the approach herein, if the TCP connection between the client and active device proceeds to a close sequence, then the active device sends the backup device a fake RST segment, which causes the backup device to terminate the replicated backup TCB. A full close segment sequence occurs when the client or active device closes a connection using a RST segment or a sequence of segments that carry bits set for FIN, FIN-ACK, FIN, and ACK.

Generally, the active device initiates closing a connection by sending a FIN segment. This approach is used because an application on a server normally initiates closing a connection; for example, in FIG. 1, normally application 106A of active device 104 initiates closing the connection on link 105 to client 102. Because application 106B on the backup device 112 is an identical instance of application 106A on active device 104, whenever application 106A determines that it should close the connection, the backup application 106B will make the identical determination and will initiate closing its fake connection at about the same time.

Because the inbound flow of segments to the active device is synchronized to the backup device, in the approach herein, the active device initiates a FIN segment only after the backup device has acknowledged receiving all data segments for a particular application. However, the backup application 106B could potentially initiate a connection closing sequence of segments slightly before the active application 106A initiates closing. Further, a switchover from the active device to the backup device could occur immediately after the backup device initiates connection closing, but before the active device has sent a FIN segment to the client.

To prevent loss of synchronization under these circumstances, the approach of FIG. 4A is used. At arrow 402, the active device sends a FIN segment to the client. At about the same time, the active device sends a fake FIN segment to the backup device, at arrow 404. The client sends an ACK segment at arrow 406 to acknowledge initiating closing the connection. At arrow 408, the active device sends a fake ACK-ACK segment to the backup device.

Using this approach, if the backup device sends a FIN segment before the active device sends a FIN segment, and the active device then performs switchover so that the backup device never receives a corresponding fake ACKACK segment, then following switchover the backup device sends a FIN to the client. In essence, by not receiving the corresponding fake ACKACK segment, the backup device knows that following connection switchover the backup device needs to initiate a FIN sequence to the client.

Alternatively, the client can initiate closing a connection. Referring now to FIG. 4B, the client may initiate a connection close by sending a FIN segment to the active device at arrow 410. In response, the active device sends a fake FIN segment to the backup device at arrow 412, which causes the backup device to synchronize to the state of the active device. The active device waits for the backup device to send a fake FIN ACK segment, shown by arrow 414, before the active device sends an ACK segment to the client at arrow 416. Such waiting ensures that the active device and backup device remain in synchronization by ensuring that the backup device acknowledges receiving the fake FIN.

The client then completes closing the connection, and sends a FIN segment at arrow 418 to indicate that closing is complete. The active device and backup device then complete closing the connection. The active device sends a fake RST segment at arrow 420 to terminate the backup TCB, and sends a FIN ACK segment to the client at arrow 422. The client sends an ACK segment at arrow 424, completing the connection closing sequence.

The backup device potentially may not receive the fake RST segment of arrow 420. In one embodiment, to prevent resource leakage, the backup device creates and operates an inactivity timer associated with each backup TCB. If the inactivity timer expires and a connection closing sequence has not occurred, the backup device purges the backup TCB.

3.4 Connection Switchover

The approach herein assumes that the backup device 112 and active device 104 each implement a redundancy protocol that detects an outage of the active device, performs a switchover of network addresses to substitute the backup device for the active device, and addresses other switchover details. Generally, the structure and function of the redundancy protocol are outside the scope of this disclosure; however, in one embodiment, the redundancy protocol may be implemented as part of the replication engines 110A, 110B.

At switchover, the backup TCB becomes active and starts accepting and processing TCP segments. The inbound data flow has been synchronized using the techniques herein, and therefore the client may transmit new TCP segments, or retransmit TCP segments that the active device did not acknowledge before switchover.

Switchover of the outbound flow will occur smoothly if the preceding approaches are used, as shown in the following observations. Assume that during switchover, the backup device was generating outbound segments having SEQ(S) and a window W. Thus, at the time of switchover, the backup device may have generated outbound segments with data having sequence number values as high as S+W. However, the backup device will not generate segments with a higher sequence number because the backup device has not received a fake ACK segment from the active device to acknowledge data previously generated.

Further, depending on the structure of the redundancy protocol, a non-zero time delay may occur as part of the switchover. However, after switchover, the backup device will receive the next ACK that the client sends. The backup device can determine the correct next sequence number for transmitting data in the outbound flow based on the value in the ACK from the client. For example, if the backup device receives an ACK segment with a value of ACK(j), then the backup device can start sending data with that SEQ number. The backup device will have all required data stored in its buffers, because the backup device has not yet received a fake ACK segment from the former active device identifying ACK(j).

A connection failure also can occur during connection establishment or termination. However, no special processing is required at the active device or the backup device, because no real data is lost.

Three other potential failure scenarios are also smoothly handled using the foregoing approaches. As a first scenario, assume that a service on the active device fails; for example, in the context of FIG. 1, assume that application 106A of active device 104 fails. Normally, upon detecting that an application or service has failed, a redundancy protocol instructs or causes TCP process 108A to send a RST segment to the client, and in some cases the TCP process can also detect an application failure and initiate a RST. However, with the approaches herein, the TCP connection can be switched over to the backup device, and application 106B can take over. Either the redundancy protocol or the TCP process 108A can be configured to perform a connection switchover rather than initiate a connection reset or close.

Certain redundancy protocols maintain the same binding of an IP address and MAC address at the time of switchover. Examples of redundancy protocols with this limitation include HSRP and VRRP. With these redundancy protocols, it may not always be possible to switch a connection to the backup device. However, when a service on proxy device fails, then the device itself is likely to be failed also. Therefore, switchover is appropriate.

As a second scenario, assume that the replication channel 120 fails or the backup device 112 fails. Because the stream replication engine 110A of the active device 104 constantly communicates with the backup device to keep flow information synchronized, and does not send ACK segments to the client until receiving an ACK from the backup, any long period of waiting for the backup device to respond will cause the client to throttle itself. Therefore, rapid failure detection at both the active device and the backup device is appropriate, and can be provided in a general unit switchover, failure detection, or other redundancy protocol, e.g. HSRP, LRP, etc.

Further, in one embodiment, the replication channel 120 is monitored by the replication engines 110A, 110B. For example, replication engine 110A of active device 104 can track whether it has received an ACK for each fake segment. In an embodiment, replication engine 110A starts a timer when sending any fake segment defined herein; if the timer expires and the active device 104 has not received a fake ACK segment from the backup device 112, the replication engine 110A determines that either the replication channel 120 or the backup device 112 have failed. In response, the active device 104 can issue an alert message, event, or other notification, and can cease replicating segments on the replication channel 120.

As a third scenario, assume that a service or application 106B on the backup device 112 fails. In response, the active device 104 should cease replication of segments for the associated connection. Typically, when a service or application 106B at the backup device 112 fails or restarts, the service or application sends a TCP RST segment over the replication channel 120 to the active device 104. Thus, receiving a RST segment at the active device 104 informs the active device to stop replication. In one embodiment, replication engine 110A ceases sending fake segments on replication channel 120, and active device 104 performs conventional TCP processing.

4.0 Implementation Mechanisms-Hardware Overview

Figure 5:
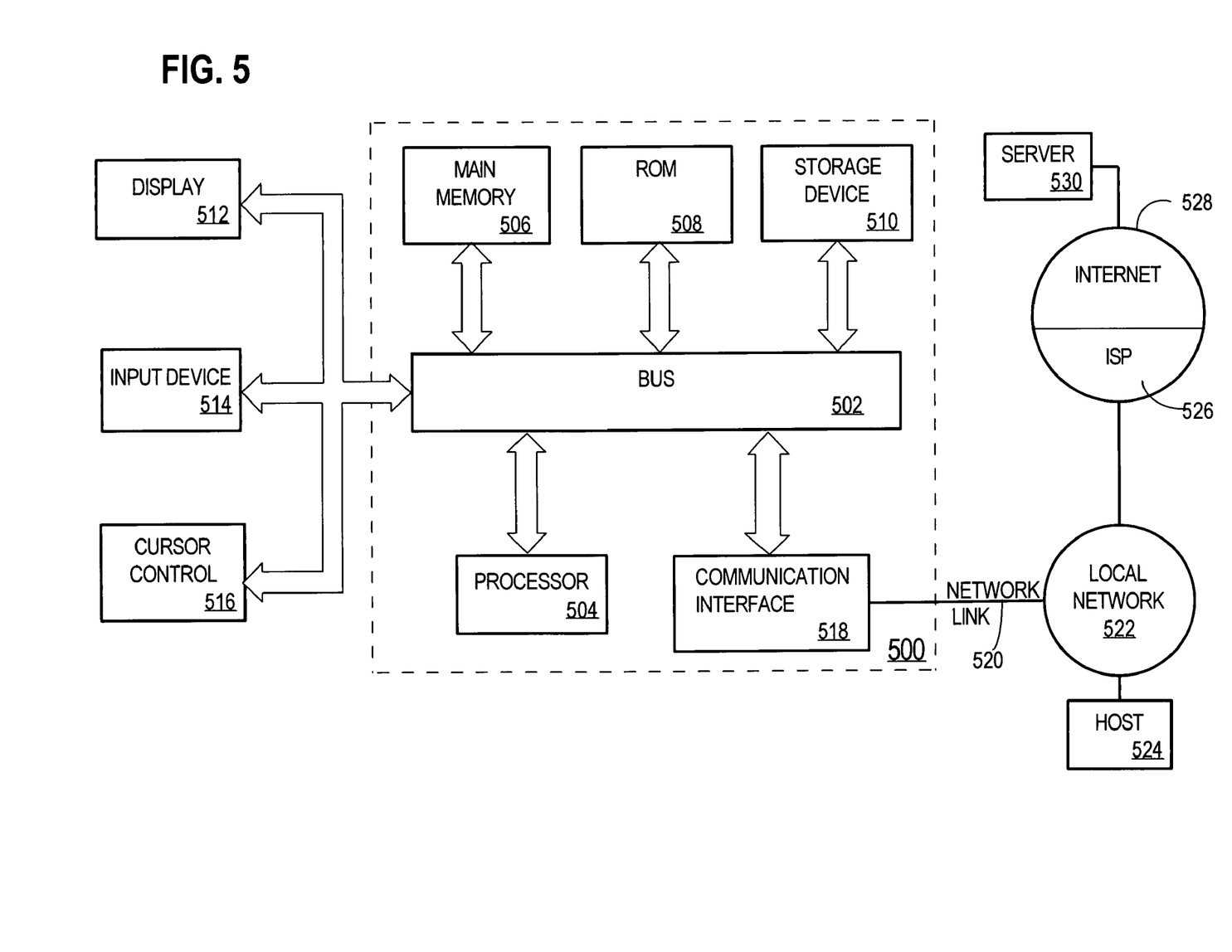
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for replicating a transport layer protocol stream. According to one embodiment of the invention, replicating a transport layer protocol stream is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for replicating a transport layer protocol stream as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

In one embodiment, the approaches herein can provide, in addition to replication and switchover of a TCP connection, replication of application-specific state information. For example, the approaches herein can support switchover of random values that are generated as part of establishing an SSL connection. Thus, an SSL stack can implement the approaches herein and interoperate with a TCP process that implements the approaches herein. In this arrangement, in operation the active device receives an SSL hello message. The backup device also receives an SSL hello as part of TCP replication. The active device then generates random data and replicates the random data to the backup device. For this data transfer, replication channel 120 can be set up as a secure link.

The backup device stores the random key generated by the active device instead of using its own random key. The active device creates a master secret. Thereafter, during bulk encryption and decryption, both the active device and the backup device can act on the SSL stream independently but in synchronization. Therefore, switchover at a future point can occur without requiring the client to repeat the SSL handshake process with the backup device.

What is claimed is:

1. A method, comprising the computer-implemented steps of:

receiving information defining a first transport connection between a first network device and a computer;

establishing a replication channel between the first network device and a backup device;

storing backup control information at the backup device;

communicating a message flow only between the first network device and the computer on the first transport connection;

in response to unavailability of the first network device, communicating messages on the replication channel that cause (a) establishing a second transport connection between the backup device and the computer; (b) continuing communication of the message flow only between the backup device and the computer on the second transport connection, based on the backup control information wherein the first network device forwards, to the backup device and using the replication channel, fake TCP segments corresponding to TCP segments received from the computer on the first TCP connection, wherein the first network device acknowledges receipt of the TCP segments only after receiving acknowledgment of the fake TCP segments from the backup device.

2. A method as recited in claim 1, wherein the unavailability is determined by communicating messages on the replication channel.

3. A method as recited in claim 1, wherein the first transport connection, second transport connection, and replication channel are TCP connections.

4. A method as recited claim 1, wherein the first network device sends an initial sequence number and window size value for the first transport connection to the backup device while the first network device is performing a TCP handshake with the computer.

5. A method as recited in claim 1, wherein the first network device tracks acknowledgment messages sent by the backup device on the replication channel, and wherein the first network device determines that the backup device or the replication channel is unavailable when the backup device fails to send expected acknowledgment messages on the replication channel.

6. A method as recited in claim 1, wherein the first network device instructs the backup device to remove the backup control information in response to closing the first TCP connection.

7. A method as recited in claim 1, wherein the first network device receives a FIN TCP segment from the computer, sends a replicated FIN segment to the backup device, and sends an ACK segment to the computer only after receiving an ACK segment from the backup device corresponding to the replicated FIN segment.

8. A method of switching a TCP connection between a client and an active device to a backup device, the method comprising the computer-implemented steps of:

receiving information defining a first TCP connection between the active device and the client;

establishing a replication channel between the active device and the backup device;

storing an initial sequence number and a window size associated with the first TCP connection in a backup TCP control block at the backup device;

receiving one or more TCP data segments from the client on the first TCP connection;

sending, to the backup device, fake TCP data segments corresponding to the received TCP data segments, wherein the fake TCP data segments are not the same as the received TCP data segments;

acknowledging, to the client, receipt of the received TCP data segments only after receiving acknowledgment from the backup device for the fake TCP data segments;

in response to unavailability of the active device, communicating messages on the replication channel that cause (a) establishing a second TCP connection between the backup device and the client; (b) continuing communication of the message flow only between the backup device and the client on the second TCP connection, based on the backup TCP control block.

9. An apparatus, comprising:

a network interface that is coupled to the data network for receiving one or more packet flows therefrom;

a processor;

one or more stored sequences of instructions which, when executed by the processor, cause the processor to carry out the steps of:

receiving information defining a first transport connection between a first network device and a computer;

establishing a replication channel between the first network device and a backup device;

storing backup control information at the backup device;

communicating a message flow only between the first network device and the computer on the first transport connection;

in response to unavailability of the first network device, communicating messages on the replication channel that cause (a) establishing a second transport connection between the backup device and the computer; (b) continuing communication of the message flow only between the backup device and the computer on the second transport connection, based on the backup control information, wherein the first network device forwards, to the backup device and using the replication channel, fake TCP segments corresponding to TCP segments received from the computer on the first TCP connection, wherein the first network device acknowledges receipt of the TCP segments only after receiving acknowledgment of the fake TCP segments from the backup device.

10. An apparatus as recited in claim 9, wherein the unavailability is determined by communicating messages on the replication channel.

11. An apparatus as recited in claim 9, wherein the first transport connection, second transport connection, and replication channel are TCP connections.

12. An apparatus as recited in claim 9, wherein the first network device sends an initial sequence number and window size value for the first transport connection to the backup device while the first network device is performing a TCP handshake with the computer.

13. An apparatus as recited in claim 9, wherein the first network device tracks acknowledgment messages sent by the backup device on the replication channel, and wherein the first network device determines that the backup device or the replication channel is unavailable when the backup device fails to send expected acknowledgment messages on the replication channel.

14. An apparatus as recited in claim 9, wherein the first network device instructs the backup device to remove the backup control information in response to closing the first TCP connection.

15. An apparatus as recited in claim 9, wherein the first network device receives a FIN TCP segment from the computer, sends a replicated FIN segment to the backup device, and sends an ACK segment to the computer only after receiving an ACK segment from the backup device corresponding to the replicated FIN segment. device corresponding to the replicated FIN segment.

* * * * *

UNITED STATES PATENT AND TRADEMARK OFFICE
CERTIFICATE OF CORRECTION

| | | |
|---|---|---|
| PATENT NO. | : 7,672,223 B2 | Page 1 of 1 |
| APPLICATION NO. | : 11/074445 | |
| DATED | : March 2, 2010 | |
| INVENTOR(S) | : Aumandra Majee et al. | |

It is certified that error appears in the above-identified patent and that said Letters Patent is hereby corrected as shown below:

IN THE CLAIMS:

Claim 1: Col. 13, line 11, after "information" insert --,--

COLUMN 13
Claim 1: Line 11, after "information," commence new paragraph.

Claim 1: Line 14, delete "on" and insert --to--.

COLUMN 14
Claim 15: Lines 64-65: delete "device corresponding to the replicated FIN segment."

Signed and Sealed this

Seventeenth Day of August, 2010

David J. Kappos
*Director of the United States Patent and Trademark Office*